United States Patent [19]

Godat

[11] 4,250,749

[45] Feb. 17, 1981

[54] APPARATUS FOR THE PREPARATION OF MIXTURES IN VARIABLE QUANTITIES FROM A FORMULATION IN PARTS

[75] Inventor: Jean Godat, Olivet, France

[73] Assignee: Fonderie & Ateliers des Sablons, Saint Jean le Blanc, France

[21] Appl. No.: 1,842

[22] Filed: Jan. 8, 1979

[30] Foreign Application Priority Data

Jan. 11, 1978 [FR] France .................................. 78 00672

[51] Int. Cl.³ ............................................. G01F 23/26
[52] U.S. Cl. ................................................. 73/290 R
[58] Field of Search ................ 73/291, 304 R, 304 C, 73/293, 301, 290 R, 290 B; 222/309, 282

[56] References Cited

U.S. PATENT DOCUMENTS

| | | | |
|---|---|---|---|
| 2,580,256 | 12/1951 | Tacchella | 222/309 X |
| 2,792,156 | 5/1957 | Camp | 222/309 |

Primary Examiner—Stanley H. Tollberg
Attorney, Agent, or Firm—Scully, Scott, Murphy & Presser

[57] ABSTRACT

Apparatus is provided for the preparation of mixtures in variable quantities from a single formulation giving the mixture in parts thereof. The apparatus includes a gauge, the vertical displacement of which, along a variable course, is obtained by a transformation, either amplification or reduction, of the displacement of an object along a predetermined path. Additionally the path can be divided into equal parts, such that at each instant the object and the gauge are positioned dividing respectively the path and the course in the same ratio. In one embodiment the object consists of a carriage which is translationally displaced along an approximately horizontal track, and the transformation is obtained by means of a ramp upon which is positioned a running wheel. The invention is particularly useful for providing mixtures of paint.

11 Claims, 6 Drawing Figures

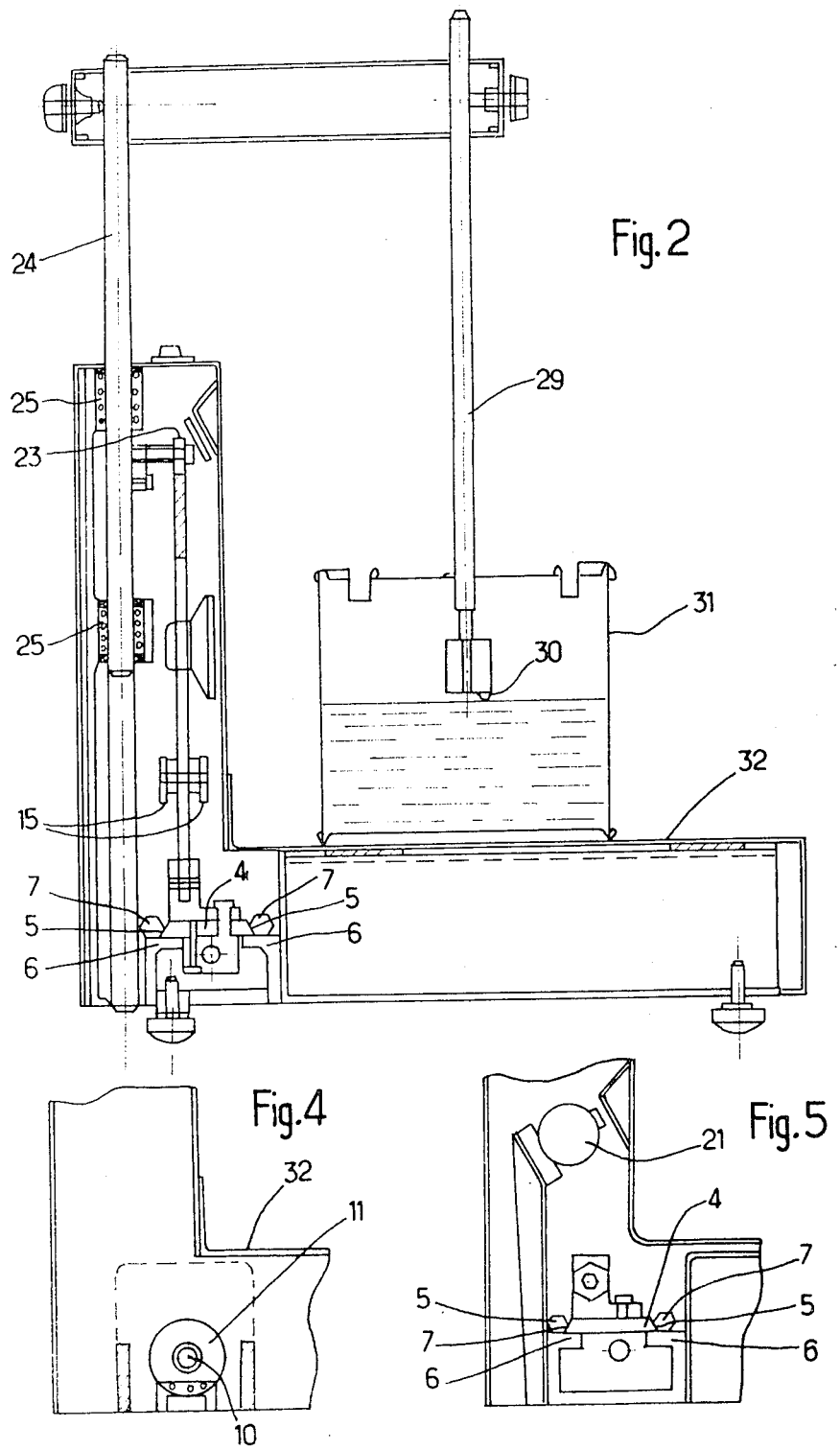

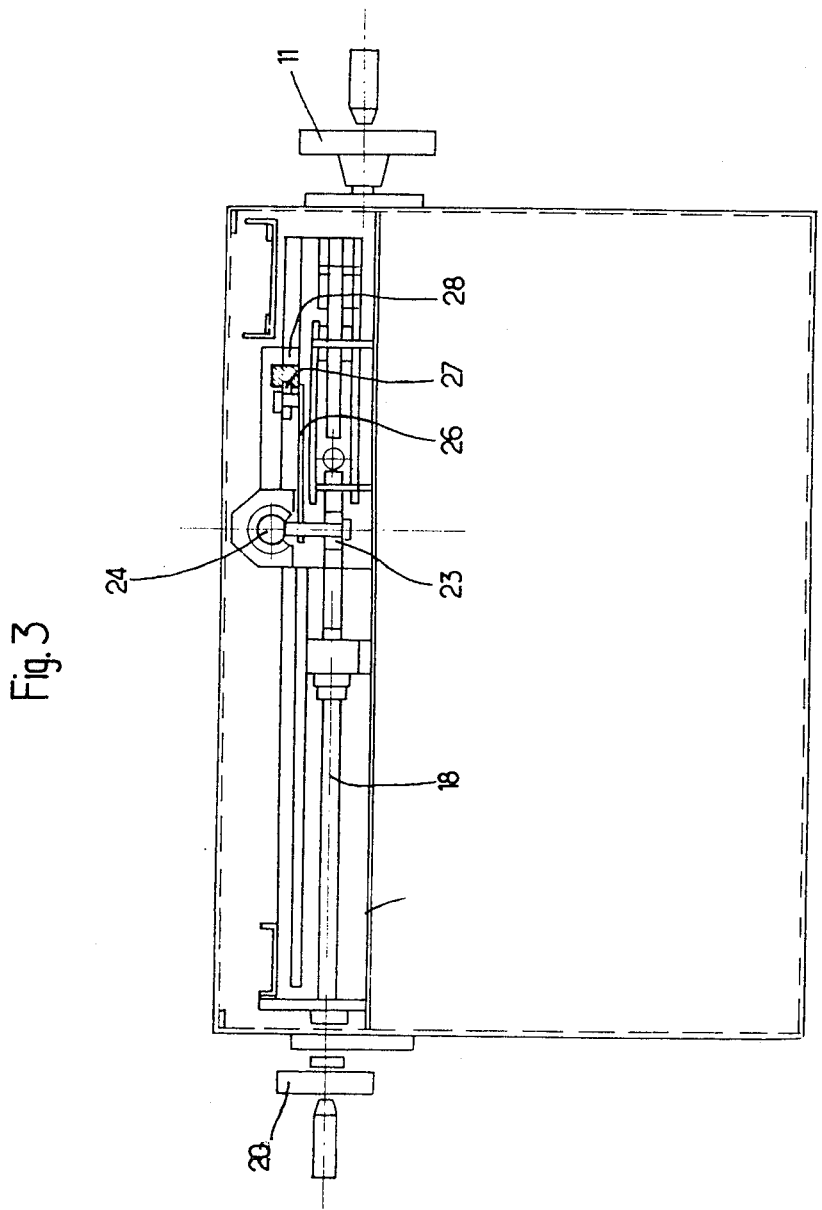

APPARATUS FOR THE PREPARATION OF MIXTURES IN VARIABLE QUANTITIES FROM A FORMULATION IN PARTS

BACKGROUND OF THE INVENTION

The present invention relates to an apparatus which may be utilized, but is not limited to, the effectuation of the preparation of mixtures in variable quantities from a single formulation, for example in 1000 or 1500 parts.

As the title indicates, the invention is advantageously applied to the preparation of special paints, for example for an automobile body, in variable quantities, for example, from 0.25 liters up to 5 liters, according to the amount of work to be accomplished.

SUMMARY OF THE INVENTION

To accomplish this result, the invention proposes an apparatus in which the vertical displacement of a gauge, along a variable course is obtained by a transformation which may be either an amplification or reduction, of the displacement of an object along a predetermined path which one can divide into equal parts, such that at each instant, the object and the gauge are found in a position dividing respectively the path and the course in the same ratio.

In other words, if the object is in a position corresponding to n parts of its path, the gauge finds itself in a position corresponding equally to n parts of its course and, accordingly, to n parts of the total volume measured by the gauge.

According to the invention, the object consists of a carriage which can be displaced in translation approximately horizontally according to a predetermined path along the guiding means, and the transformation is obtained by means of a ramp or "sine bar" of adjustable inclination, in dependence on said carriage and upon which is mounted a solid bearing for the gauge. The displacement in linear translation of the carriage is preferably obtained by the conversion of the rotational movement of a turning piece such as a handwheel, the number of turns of which may be indicated with the aid of a counter. Thus, the counter yields at each instant the number of parts of mixture corresponding to the position of gauge. The inclination of the ramp can be modified in a known manner, from a rotation of a turning piece such as a control wheel, the number of turns of which can also be counted by means of a second counter, which allows a marking of a total quantity of mixture desired to be obtained.

BRIEF DESCRIPTION OF THE DRAWINGS

A method of carrying out the invention is described below, as a nonlimitative example, with reference to the attached drawings in which:

FIG. 2 is a transverse vertical section in the plane of the rod of the apparatus shown in FIG. 1;

FIG. 3 is a horizontal section along line A—A of FIG. 1;

FIG. 4 is a vertical sectional view along line B—B of FIG. 1;

FIG. 5 is a vertical sectional view along line C—C of FIG. 1; and

DETAILED DESCRIPTION OF THE DRAWINGS

Figure 1:
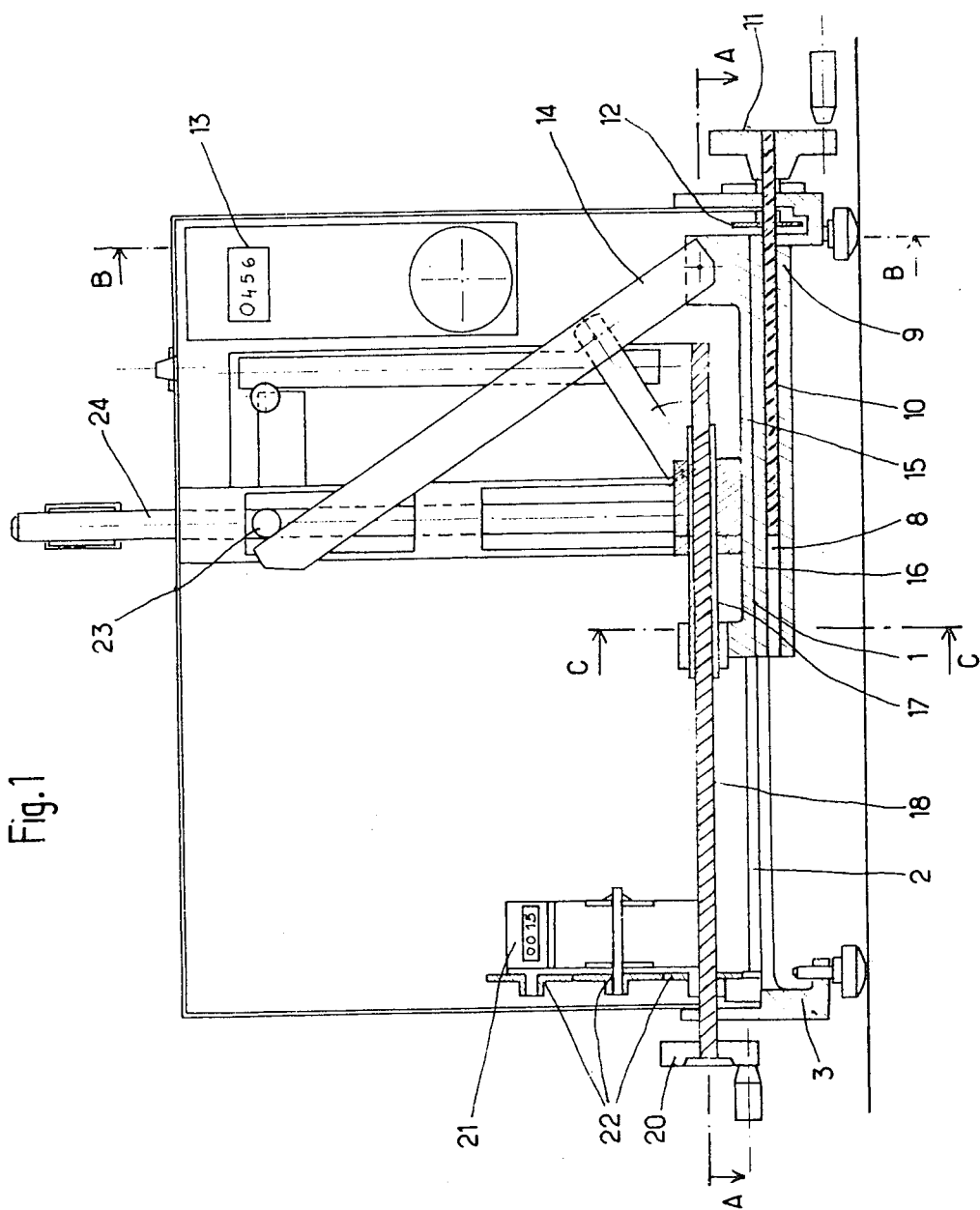
FIG. 1 is a schematic longitudinal vertical section of one embodiment of the invention.

With reference to FIGS. 1 to 5, the apparatus according to one embodiment comprises a carriage 1 slidingly mounted upon a horizontal track 2 fixedly mounted upon a frame 3. The carriage 1 includes a base plate 4 having bevelled lateral edges 5 which match the profile of track 2 in which it slides.

Track 2 includes two C-shaped returns 6 cooperating with two hexagonal retainers 7. Carriage 1 is displaced along track 2 by means of a screw/nut system wherein the nut consists of a screw nut 8 set in a solid piece 9 of the carriage, which passes between C-shaped returns 6, and wherein a threaded shaft 10 is axially retained within frame 3. Threaded shaft 10 terminates in a free turning handwheel 11. The number of turns of threaded shaft 10 is counted by means of a rotating encoder disc 12 which rotates by photosensitive diodes coupled to a bidirectional counting circuit and an output display 13. This counting circuit counts up for rotation of disc 12 in one direction, and counts down for rotation of disc 12 in the opposite direction. Moreover, the counter can be automatically reset to zero by means of a microswitch (not shown) provided for this purpose, and by the passage of vertical bar 24 by its corresponding position. A sine bar 14 is pivotally mounted on carriage 1, and its angular position is controlled by two connecting rods pivotally coupled at each of their ends, first by sine bar 14, and also by a screw nut 16 mounted on a horizontal screw shaft 17, rotationally mounted on carriage 1. This screw shaft includes a substantially cylindrical axial bore having two bearings through which pass following rod 18 having a substantially complementary shape. Rod 18 is itself rotationally mounted in frame 3 of the apparatus, and terminates in a freely turning handwheel 20. Accordingly, the position of carriage 1 is controlled by screw shaft 17.

The angular position of rod 18, and consequently of screw shaft 17, is displayed by a mechanical turn counter 21 coupled to shaft 18 by means of a series of gears 22.

When sine bar 14 is displaced horizontally with carriage 1, it causes a vertical movement of a solid roller 23 of a vertical bar 24 axially guided for vertical movement within two casings of a frame or by any other suitable guiding system such as, for example, a system of friction rollers.

Vertical bar 24 is rotatably guided by lever 26 which comprises a bearing element 27 slidably retained in a guiding groove 28.

Vertical bar 24 supports a rod 29 having at its extremity a level detector 30 which may be inserted, as shown in FIG. 2, into the interior of a cylindrical container 31 positioned on base plate 32 of the apparatus. It should be noted that because vertical bar 24 is returned toward the base only by the action of roller 23 on sine bar 14, it can be freely raised, for example at the time of placement of container 31 on base plate 32.

The operation of the apparatus, in accordance with its application for the proportioning of a mixture of paint for example in 1500 parts, (such as 1000 parts for the mixture itself and 500 parts for the diluent) is as follows:

Initially the inclination or angular position of sine bar 14 is controlled in accordance with the total volume of paint desired, and is regulated by turning handwheel 20. The desired angle is obtained by reading on counter 21 the number of turns of wheel 20, with this number being read from a table marked as by photoengraving on the surface of the apparatus. This table permits the selection of volumes as a function of diameters and containers currently utilized.

It is apparent that if sine bar 14 is set at 45°, the vertical displacement of rod 29 will be the same as the horizontal travel of carriage 1. If the angle of sine bar 14 is set greater than 45°, the travel of rod 29 will be greater than that of carriage 1. Also, it will be less than carriage 1 if the angle of the sine bar 14 is less than 45°.

Accordingly, if it is desired to obtain a mixture having a formula in 1500 parts, the number of turns required to displace carriage 1 from one end to the other of the track can be, for example, selected to be seventy-five. In this case, encoder disc 12 generally takes twenty turns to travel from one end to the other. One can also select 1000 parts or 100 parts or any other formulation in parts and can also vary the number of turns of disc 12, or the rotation of screw shaft 10, or even the course of carriage 1, or yet a combination of two or three of these factors.

Once the angular setting of sine bar 14 has been determined, one successfully marks the parts of mixture in the order in which they are furnished by the formula, while accurately verifying each time that the liquid level is at the extremity of rod 29. To facilitate this operation, the latter can include a capillary system which provokes a capillary "flash" when the liquid rises to the level of the rod. The rod can also be equipped with a level detection system (proximity detector) delivering a sound or light signal. Alternatively, the reading of a galvanometer may be utilized in a manner to progressively indicate the approach of contact of the liquid with the rod.

According to one particularly advantageous embodiment of the invention, the rod can utilize for its operation the capacitive effect during its approach to the surface of the liquid (which is slightly conductive) and the effect of the current at the moment of contact, with a suitable electronic circuit, to produce in a transducer or loudspeaker characteristic acoustical modulations.

It should be noted that in addition to the advantages previously mentioned, the apparatus according to the invention allows a highly precise measurement, essentially because the mechanical system utilized does not have friction and play, these being compensated for by the weight of the elements in movement.

Moreover, wear in the apparatus is practically eliminated since all functional movements are guided by bearings.

Figure 6:
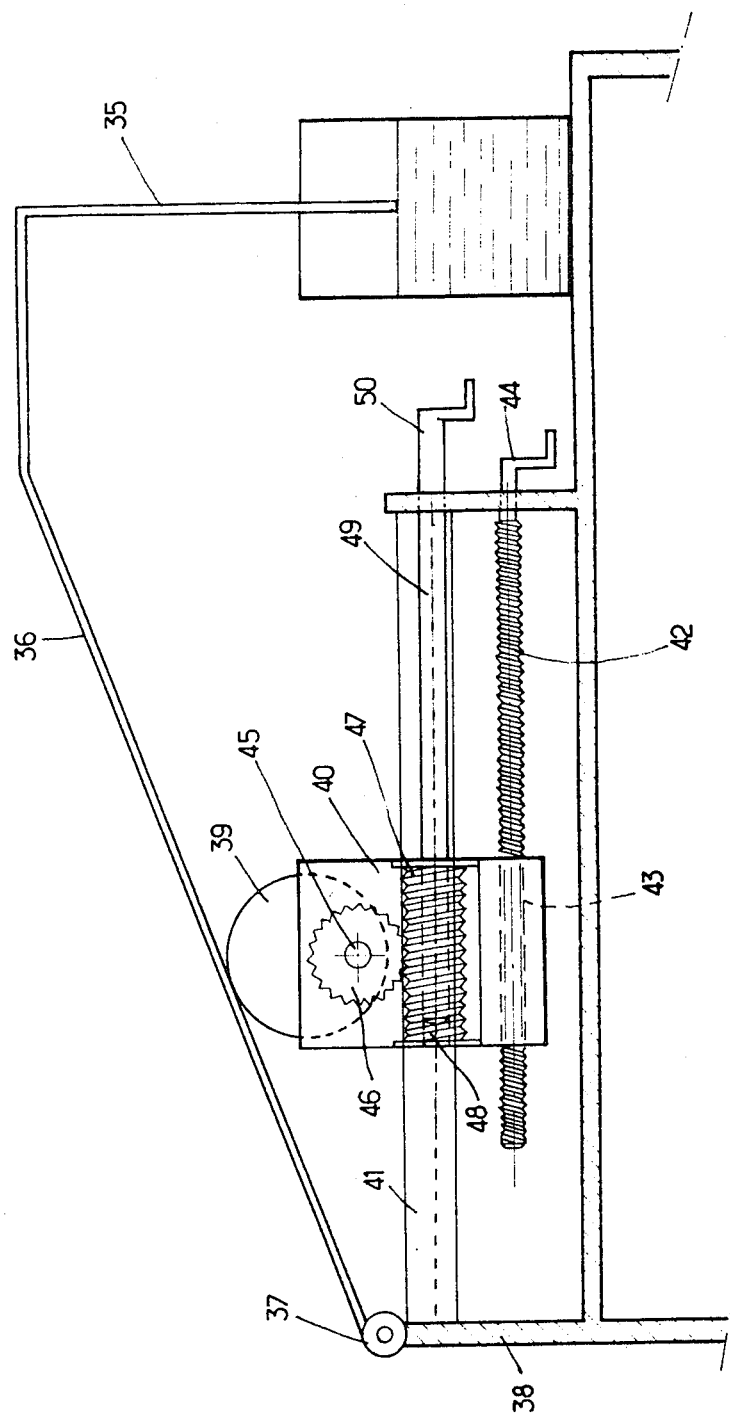
FIG. 6 is a schematic longitudinal vertical section of an apparatus according to another embodiment of the invention.

In the embodiment shown in FIG. 6, rod 35 is carried by a shaft 36 pivotally mounted at one end by means of hinge 37 on frame 38 of the apparatus.

This shaft 36 rests upon a cam 39 pivotally mounted on carriage 40 which is displaced along track 41 situated in the vertical plane passing through said shaft 36.

The displacement of carriage 40 is obtained by means of a threaded shaft 42 passing through a screw nut 43 of the carriage. This threaded shaft 42 can be rotationally moved by means of a crank 44, the number of turns of which may be counted by means of a counting system (not shown).

Cam 39 is pivotally mounted on carriage 40 by means of a bearing and an axle 45, in dependence upon the movement of gear 46 which engages a horizontal worm gear 47 also mounted for horizontal rotation on carriage 40. This endless worm gear 47 presents an axial bore 48 through which a shaft 49 freely slides, with the shaft being rotated by a crank 50, the number of turns of which may be counted by means of a counting system (not shown). The respective sections of bore 48 and of shaft 49 are designed in a manner to permit the rotational movement of the worm gear 47 while at the same time allowing its axial displacement along shaft 49.

The operation of the apparatus is very close to that previously described, and will not be repeated again. However, it should be noted that in this embodiment the resetting of the total volume of the mixture which is desired and the computation of the number of parts can be obtained with one or the other of the two turn wheels 44 and 50.

What is claimed is:

1. Apparatus for allowing the preparation of mixtures in variable quantities starting with a formulation given in parts of mixture, comprising a gauge, a track, a carriage on the track and a ramp on the carriage and wherein the vertical displacement of the gauge along a variable course is obtained by a transformation in magnitude of the displacement of the carriage in a substantially horizontal direction along the predetermined track which may be divided into equal parts, said transformation being obtained by an interdependent carriage ramp having an interdependent bearing of said gauge in which said carriage and said gauge define positions dividing respectively said track and said course in the same ratio.

2. Apparatus according to claim 1, in which the said ramp is interdependent of the gauge, and is mounted on an interdependent bearing on the carriage.

3. Apparatus according to claim 1 in which the slope of said ramp is variable.

4. Apparatus according to claim 1, characterized in that the said bearing is carried upon a vertical shaft movable in guiding means and mounts said gauge on its upper surface.

5. Apparatus according to claim 1, characterized in that said ramp is rotationally mounted on the carriage and in that in its inclination is controlled by at least one pivotable rod, which at one end is connected to the ramp and on the other end to a nut mounted on a horizontal worm gear pivotally mounted on the carriage.

6. Apparatus according to claim 1, characterized in that the gauge is carried by a rod which is mounted by a pivotable shaft, pivoted at one of its ends around a fixed axis, in that this shaft rests upon a cam pivotally mounted on said carriage which is moved along a track by means of a threaded shaft rotated by a crank and wherein the number of turns may be counted and in that said cam is moved by a rotating piece wherein one can count the number of turns.

7. Apparatus according to claim 1 or 2 or 3, characterized in a turning element and a first counter to count the turns of said element, arranged such that the displacement in linear translation of said carriage is obtained by conversion of the rotational movement of said turning element wherein said first counter is utilized to count the number of turns of the turning element.

8. Apparatus according to claim 7, characterized by a turning piece and a second counter to count the number of turns of said piece, arranged such that the inclination of the ramp can be modified by rotating said turning piece, and wherein the number of turns of the turning piece are recorded by said second counter.

9. Apparatus according to claim 8, characterized in that the said first counter comprises an encoder disc associated in counting registry with a numerically indexed counter.

10. Apparatus according to claim 4, characterized in that said vertical shaft is dependent for its movement on a lever terminated by a bearing which slides in a guard channel.

11. Apparatus according to claim 5, characterized in that the said worm gear comprises a substantially axial element, through which axially slides a following shaft in dependence upon the rotation of said worm gear, and this shaft has on its end a handwheel connected to a counter through the intermediary of a gear train.

* * * * *